Dec. 26, 1967  M. GREGA  3,360,196
TIME AND SPACE CHART
Filed July 8, 1965  4 Sheets-Sheet 1
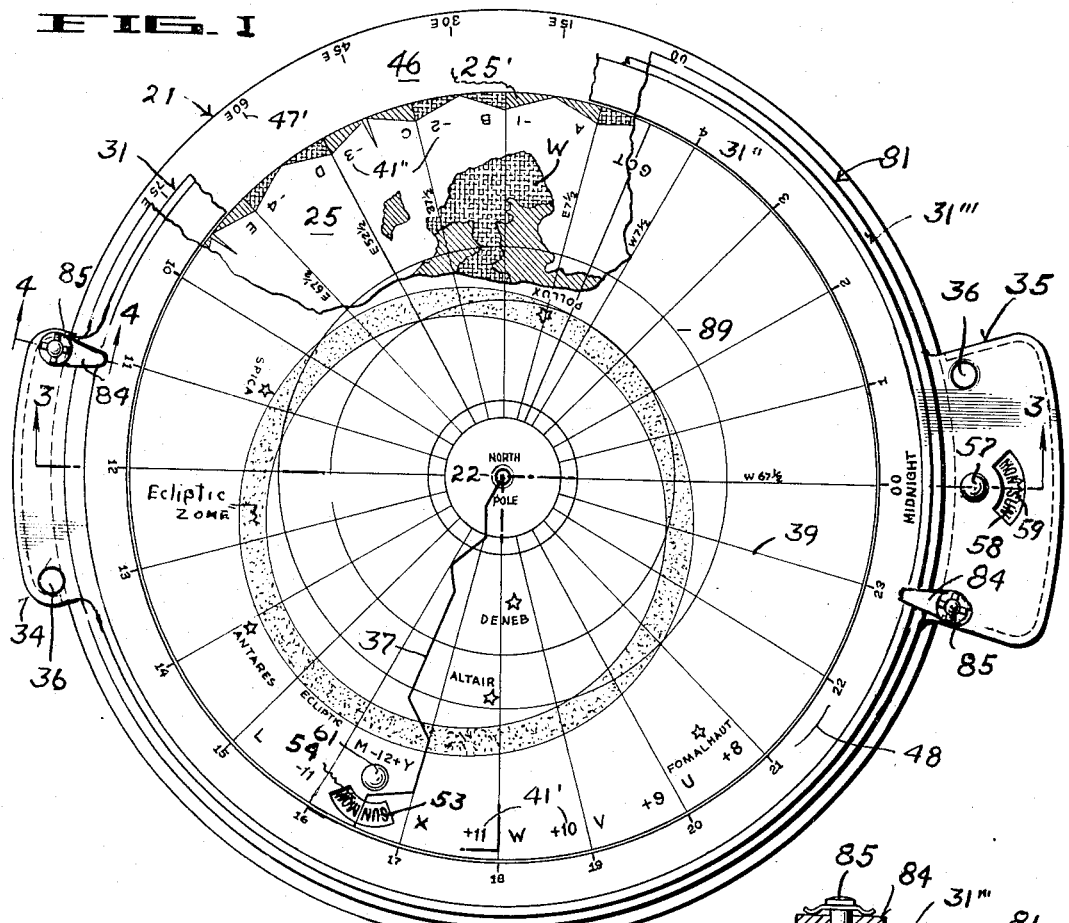
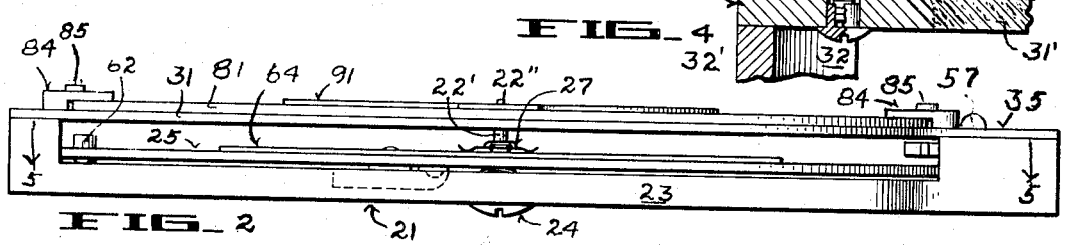
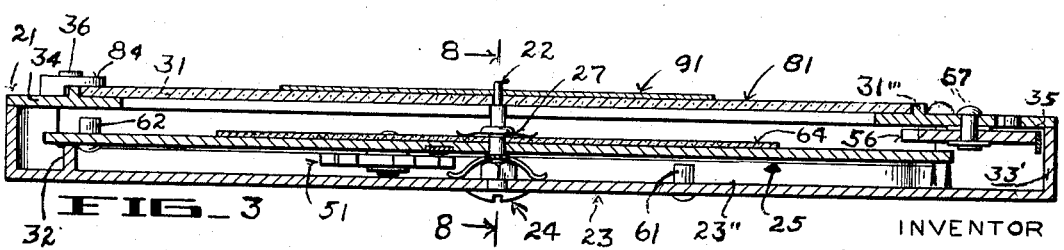
INVENTOR
MIKE GREGA
BY Henry N. Young
ATTORNEY Dec. 26, 1967
M. GREGA
3,360,196
TIME AND SPACE CHART
Filed July 8, 1965
4 Sheets-Sheet 2
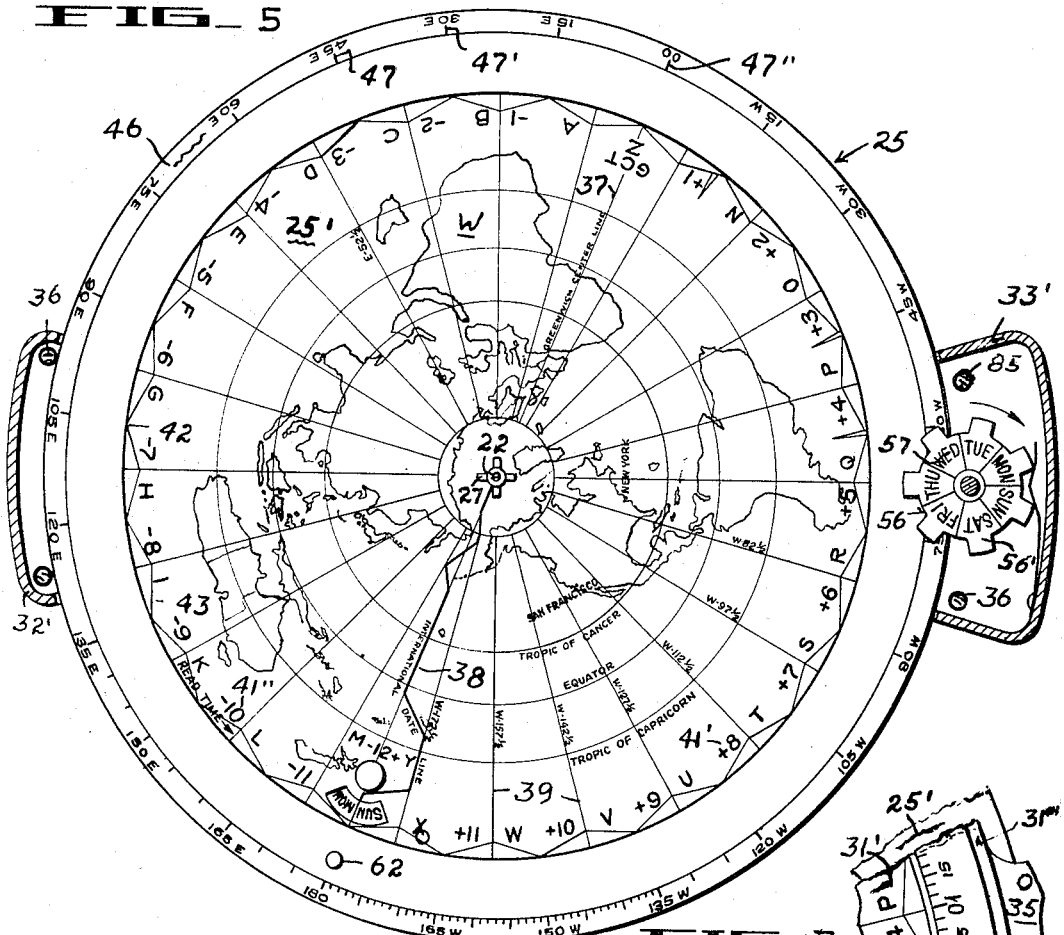
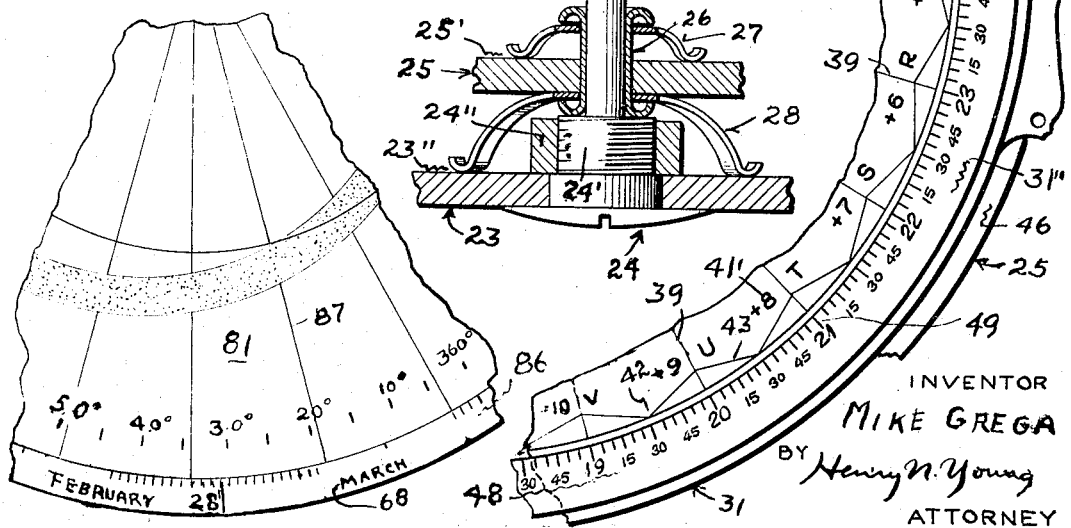
INVENTOR
MIKE GREGA
BY Henry N. Young
ATTORNEY Dec. 26, 1967  M. GREGA  3,360,196
TIME AND SPACE CHART
Filed July 8, 1965  4 Sheets-Sheet 3
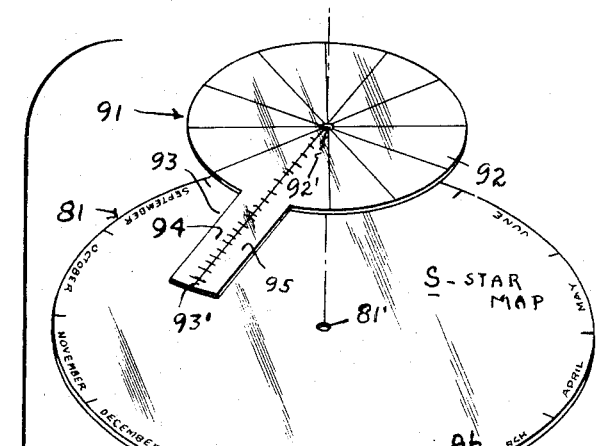
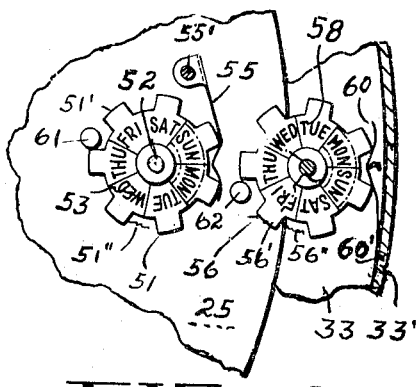
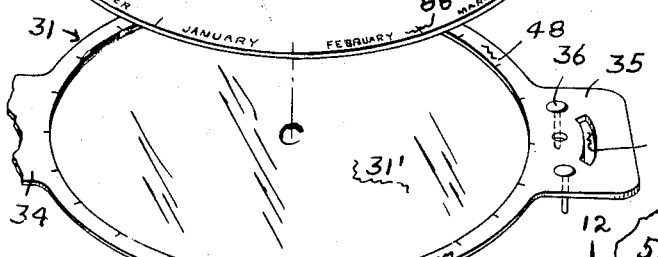
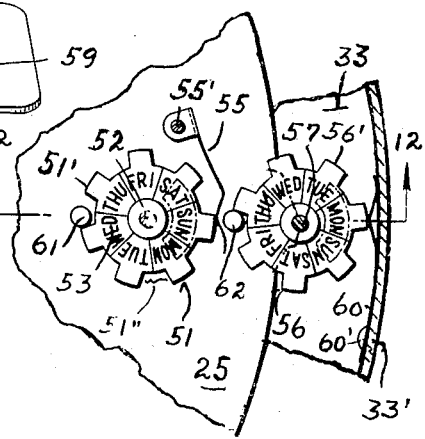
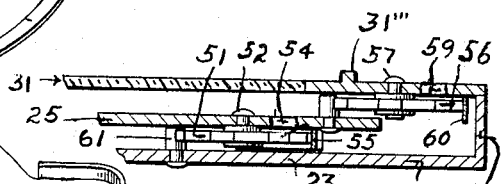
INVENTOR.
MIKE GREGA
BY Henry N. Young
ATTORNEY Dec. 26, 1967   M. GREGA   3,360,196
TIME AND SPACE CHART
Filed July 8, 1965   4 Sheets-Sheet 4
FIG_13
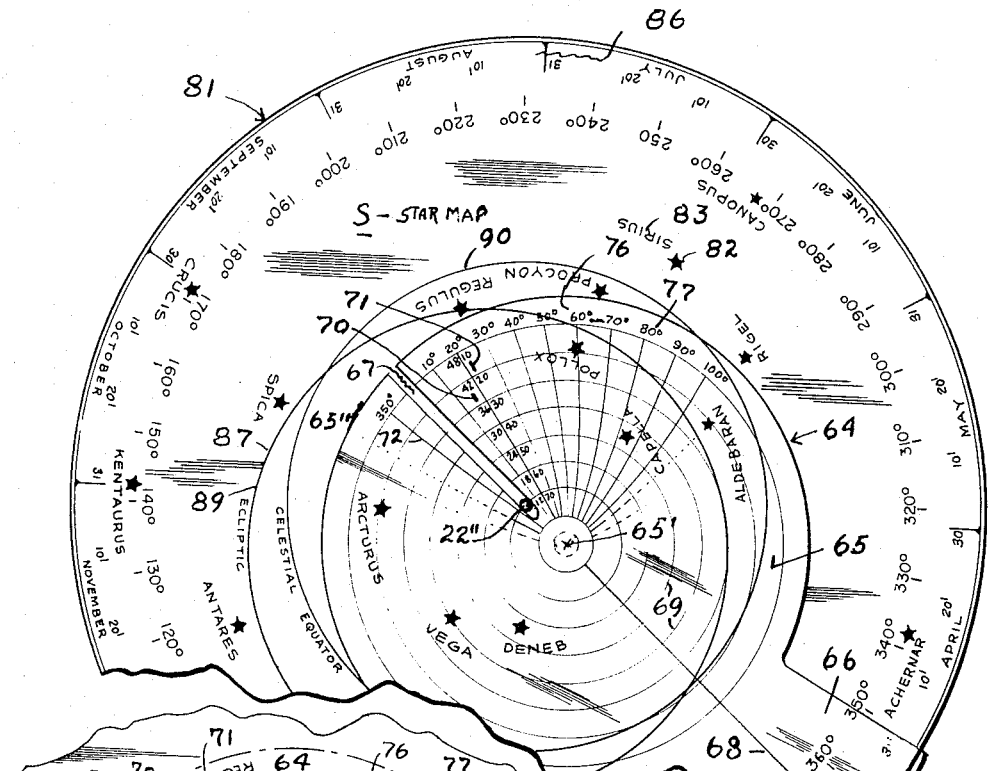
FIG_14
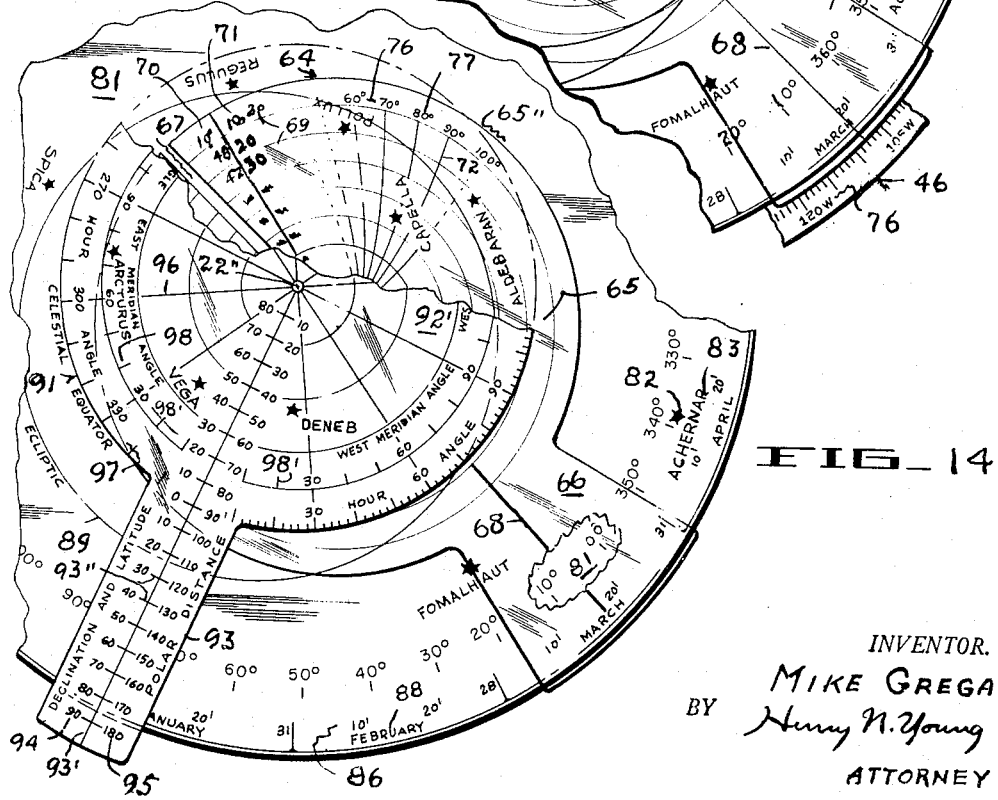
INVENTOR.
MIKE GREGA
BY Henry N. Young
ATTORNEY

# United States Patent Office 3,360,196
Patented Dec. 26, 1967

3,360,196
TIME AND SPACE CHART
Mike Grega, 3243 Fairview, Alameda, Calif. 94501
Filed July 8, 1965, Ser. No. 470,534
5 Claims. (Cl. 235—88)

The invention relates to a unitary device, or chart, for ascertaining simultaneous terrestrial and celestrial time and space relations.

In addition to determinations of corresponding Earth times in different time zones, the present device includes a chart for positively and simultaneously indicating the calendar day in points of referencing and referenced time zones, and further provides for ascertaining distances and directions between compared Earth points. A present chart assembly also provides a star disc for use in determining the Earth position in reference to celestrial bodies as a basis for useful astronomical information, with particular reference to the directing of vehicles including Earth satellites for space travel from a standpoint of time and direction and distance, all by a single unit having educational and instructive and directive value.

With particular reference to Earth determinations, a more specific object is to provide a means for simultaneously indicating Earth directions and distances between time-compared Earth points, as a possible aid to aerial navigation.

Another object is to provide a unit of the character described having a practicably usable means for locating relatively fixed heavenly bodies for reference use with a sextant or similar instrument in terms of direction and angular relation to the Earth at a given reference point.

A further object is to provide information for ascertaining the position and course and height of a moving satellite with respect to the Earth, as well as the projection angle and direction for launching such a satellite.

An added object is to provide aerial or space navigation data for an imaginary or real use of stars with reference to a given Earth point.

A general object is to provide a chart of the character described having its cooperative elements relatively simple and such that they avoid or minimize the use of special tabulations, while possessing both educational and instructional value.

The invention possesses other objects and features of advantage, some of which, with the foregoing, will be set forth or be apparent in the following description of typical assemblies thereof, and in the accompanying drawings, in which, FIGURE 1 is a broken-away plan view of a chart assembly.

FIGURE 2 is a side elevation of the chart assembly of FIGURE 1.

FIGURE 3 is a sectional view at the line 3—3 in FIGURE 1.

FIGURE 4 is an enlarged fragmentary section taken from the line 4—4 in FIGURE 1.

FIGURE 5 is a plan view taken below the line 5—5 in FIGURE 2.

FIGURE 6 is an enlarged fragmentary plan view of an upper element of the assembly.

FIGURE 7 is an enlarged fragmentary plan view at an hour-circle scale.

FIGURE 8 is an enlarged fragmentary sectional view taken at the line 8—8 in FIGURE 3 and showing a common pivotal connection for relatively movable elements of the assembly.

FIGURE 9 is an exploded view of disc-like elements of the assembly.

FIGURE 10 is an enlarged fragmentary plan view taken below the plane of the line 5—5 in FIGURE 2 and showing two set day-indicating devices in radially aligned adjacency at the international date line.

FIGURE 11 is a view similar to FIGURE 10 and showing relative positions of the indicators of FIGURE 10 during their movements between relatively set positions thereof.

FIGURE 12 is a sectional view taken at the line 12—12 in FIGURE 11.

FIGURE 13 is a fragmentary plan view showing the cooperative elements of the chart assembly as related during the use of a celestial star map element of the assembly.

FIGURE 14 is a fragmentary plan view showing an accessory template element as applied to the assembly of FIGURE 13 for acquiring various navigational data including polar distances, declination, latitude, etc., by the use of the celestial star map.

Various relatively adjustable elements of a chart assembly for carrying out the aforesaid and other objects of the invention are cooperatively carried on a mounting base element 21 which fixedly carries an upstanding spindle 22 extending rigidly from a generally central interior point of a bottom portion 23 thereof for cooperative use with certain other elements as an axis of rotative adustments therefor. As particularly brought out in FIGURES 3 and 8, the spindle 22 comprises an extending upper portion of a headed stem member 24 having a reduced cylindrical part 24' extending upwardly in fitted engagement through and beyond a complementary bore provided in the base portion 23, with said part 24' threaded at its extending upper portion for mounting a lock nut 24" which fixedly clamps the inserted part 24 to the base bottom 23. As shown, the spindle 22 comprises, per se, a reduced and intermediately stepped coaxial extension of the part 24' of the member 24 having respectively larger lower and smaller upper coaxial spindle portions 22' and 22"

By a particular reference to FIGURES 1 to 3 and 8, it will now be noted that an opaque map-providing disc 25 is concentrically mounted on the lower spindle portion 22' and above the lock nut 24" for its frictionally resisted rotative adjustment about the lower spindle portion 22', and has delineated on a central portion of its upper face 25' an Earth map W in polar azimuthal equidistant projection with respect to the North Pole of the Earth as defined at a central disc bore 25". As shown, the map disc bore 25" closely receives therethrough an outwardly and terminally flanged tubular element 26 having the lower spindle portion 22' disposed through and journaled in the bore of its hub portion, with said flanges providing seats for spring members 27 and 28 which are constantly operative between the different flanges and the upper face of the plate 23 and disc 25 respectively. The present spring members 27 and 28 respectively have central hub portions from which downwardly arched spring arms integrally radiate for terminal sliding contact with the outer faces of said plate and disc, whereby the spring members 27 and 28 constantly and frictionally grip the central portion of the Earth map disc 25 between them to provide for rotary adjustments thereof between different set positions.

For its use in time and space determinations, the map disc 25 is mounted on the spindle 22 for its rotative adjustment below a member 31 comprising a base portion which is fixedly mounted on the member 23, which is of circular outline except at oppositely directed radial extensions 32 and 33 respectively providing upstanding U-shaped bounding flanges 32' and 33' of like uniform height upon and against which the member 31 is releasably secured in parallel spaced relation to the base member 23. As shown, oppositely directed radial extensions 34 and 35 of the otherwise circular upper base portion 31 are complementary in outline to the extensions 32 and 33 of the member 23, and are fixed to and against the respective flanges by bolts 36 disposed outwardly of the circular peripheral edge of the installed map disc 25. The member 31 preferably has a transparent circular central portion 31' which receives the outer spindle portion 22' axially therethrough while providing a protective pane opposite the underlying map W for a viewing of the Earth map W therethrough, and is opaque at its annular map-rimming portion 31" which includes the extensions 32 and 33 and provides a continuous uniform outstanding annular flange 31'" extending upwardly from the outer edge of its circular part between the extensions.

The map W is delineated on a circular central area of the upper side face 25' of the disc 25 for viewing through the pane 31' of the disc 31 and includes time zone delineations, including a radial line 37 from the map center designating the basic time zone meridian through Greenwich in England, and an oppositely-extending line 38 designating the international date line through the Pacific Ocean. Meridian lines 39 radiate from the disc center to the edge of the map area to define between them the twenty-four global fifteen-degree time zones, and said zones are variably identifiable with respect to the Greenwich meridian by circular lines of identifying scales both along and beyond the outer edge of the map area. Thus, the various time zones are designated in order with reference to the Greenwich meridian at the outer edge portion of the map area by lines of associated plus numbers 41' and minus numbers 41", as well as by a line of successive identifying letters for indicating meridians to the East and to the West from the meridian of the Greenwich zone toward the international date line, with the zone centers conveniently indicated at the map area edge at points 42 which are defined at the intersections of oblique lines 43 extending from adjacent meridian lines 39 and beyond.

By particular reference to FIGURES 1 and 3 and 5 and 7, it will be noted that an annular rim portion of the mounted map disc 25 extends beyond its map zone area to an annular disc rim portion 46 which is exposed for viewing beyond the outer edge of the opaque annular portion 31" of the base member 31 and provides a circular time scale 47 coaxial with the spindle 22 and having radial lines 47' which indicate the centers of the time zones of a twenty-four hour day, and are designated by appropriate numerals and direction indications E. (East) or W. (West) with reference to the zero index mark 47" of the Greenwich time zone. Also, the bounding rim portion 31" of the base member 31 presents an hour circle 48 in a continuous annular area having the time zones designated in terms of a twenty-four hour day in a counter-clockwise direction between radial meridian lines 49 of the continuous hour-designating circle having its zero point 48' at the international date line meridian 38 and additionally designated by the word "MIDNIGHT" (FIGURE 7), it being noted that the extending portion 46 of the map disc 25 is usable for effecting a manual turning of the disc for selectively aligning the meridian lines 37 or 39 of the map disc with the meridian lines of the base member 31.

The present unitary assembly comprising the base element 21 and the map disc element 25 and the base member 31, may be directly used to determine the simultaneous clock times at different terrestrial points in terms of the actual or assumed time at one of said points by registering the map zone point 46 and the corresponding line 38 of the outer map disc zone 37 for the map location of reference with the appropriate hour circle indication of the referenced time zone and then ascertaining the corresponding time at the referenced zone by a direct identification at the hour circle 48 of the time zone of the referenced point. In this manner, as is generally taught by my U.S. Patent No. 2,587,615 which issued on Mar. 4, 1952, simultaneous times with respect to any reference zone may be ascertained for any desired number of terrestrial points to facilitate direct determinations within the corresponding hours, it being noted that the present unit need not provide indications of minutes or seconds within the indicated time zone hours, since such information would be available for setting reference by a necessarily provided operating chronometer or clock.

By reason of the change of day which occurs as the International date line is passed, a means is preferably provided for positively indicating on the present chart assembly the change in days by reason of a passing of the international date line at opposite sides of which successive days are different at midnight, with some convenient variations. For instance, the Central time zone for North America generally straddles the meridian line "97½" which comprises the west boundary of its theoretical zone, and the Union of South Africa, which is substantially two zones wide, has "—2" for its entire area, while the international date line 38 has lateral offsets within the zone defined between its bounding meridians for generally avoiding its passage through land areas or politically associated island groups in the Pacific Ocean, as are appropriately indicated on the map W. Also, for reference, important time zones, as for cities and/or airports, may be listed in appropriately indexed and available tabulations thereof.

The present and preferred means for indicating the corresponding calendar days in different reference and referenced time zones is under the control of the map disc 25 and, as disclosed in FIGURES 1 and 5 and 9 to 12, includes a day-indicating member 51 which is rotatably carried beneath the disc 25 and above the base member 23 on a pivot pin 52 fixedly depending from said map disc 25 and comprises a peripherally notched disc member providing seven teeth 51' between like notches 51". Inwardly of its teeth 51', the member 51 is provided with a continuous designating circular indication of seven days of the week indicia 53 from Sunday (Sun.) to Saturday (Sat.) inclusive for selective registration in pairs with an arcuate sight opening 54 provided in the disc 25 outwardly of the pivot. As shown, the center line of the arcuate opening 54 is radially outwardly of the disc-carrying pivot pin 52, and said opening is of sufficient arcuate length to simultaneously and selectively display at least two adjacent day indicia 53 while the member 51 is held in set position by a suitable spring detent means. As particularly indicated in FIGURES 10 and 11, the detent means for releasably holding the member 51 in adjusted positions thereof comprises a leaf spring 55 which extends radially from an anchoring pin 55' depending fixedly from the disc 25 and said detent spring has a transversely offset portion which is normally engaged inwardly of and between adjacent teeth 51' of the member, as in FIGURE 10.

The means for indicating corresponding calendar days in different reference and referenced time zones under the control of the map disc 25 further includes a day-indicating member 56 which is similar to the member 51, is rotatably carried on and beneath the extending cover plate portion 35 on a depending pin 57, and has seven teeth 56' between like circumferential notches 56". Inwardly of its teeth 56', the member 56 is provided with a continuous circular array of week-day indicia 58 for selective registration with a coaxial arcuate sight opening 59 provided in the cover-plate extension 35 for simultaneously displaying two successive day indicia 58 under control of a detent means. As shown, the arcuate opening 59 is radially outwardly of the disc-carrying pivot pin 57 and the present detent means for releasably holding the member 56 in adjusted positions thereof comprises a leaf spring 60 which extends radially from an anchoring rivet 60' mounted in the outer part of the flange 33' of the base plate extension 33 in radial relation thereto and has an arcuate portion which functions as the detent 55 for the member 51.

Noting that the day-indicating members 51 and 56 are respectively disposed above the map disc 25 and below the extension 35 of the base member 31 in planes parallel to the disc, the bottom member 23 of the base assembly fixedly mounts an upstanding pin 61 in position to engage between the teeth 51' of the member 51 for rotatively adjusting the member, and the map disc 25 fixedly mounts an upstanding pin 62 in position to engage between the teeth 56' of the day-indicating member 56 for rotatively adjusting the same by an action of the disc 25. Since calendar day changes occur only when the international date line meridian 38 is crossed during a rotation of the Earth, the spindle 52 which carries the member 51 on the disc 25 is located in said meridian, and the pin 61 on the base plate 23 may be centered in a notch 51" of the member 51 when said international date line meridian 38 is aligned with the "00," or "MIDNIGHT" mark 49' of the hour circle 48. Correspondingly, the upstanding pin 62 mounted on the map disc 25 is so located on the meridian 38 of the disc that it is simultaneously centered in a notch 56" of the member 56 and is located on the line 38 inwardly of the spindle 57, it being obvious that the like arcuate lengths of the notches 56" must be appropriately less than that of the notches 51".

It will now be noted that when the present time-comparison assembly is to be utilized for ascertaining simultaneous Earth times in different time zones, the map disc 25 is turned to register the reference zone of the time scale 47 thereof with the appropriate hour-time indication of the hour circle 48 of the map disc 25 by rotating the disc until the indicia 53 of the member 51 displays the appropriate two days in the sight opening 54. It will be understood that whenever the international date line is moved over the midnight position on the time circle, the day indications of the members 51 and 56 will be simultaneously and reversedly changed by one day until the appropriate day combination is reached in terms of the day then displayed at the reference zone. Also, since the progressive day indications of the members 51 and 56 are to be constantly matched, any error in such a relation of the displayed portions thereof is readily correctable by peripherally engaging and turning the member 56 in either direction against the yielding resistance of the detent 60 to provide the desired corresponding readings, as through the sight opening 59 in the extension 35 of the plate 31.

The present chart assembly for global determinations may also be used for determining the distances and the compass direction between different global points, and for this purpose a transparent template element 64 is provided for cooperative use with the map of the disc 25. As shown in FIGURES 2 and 3 and 9 and 13 and 14, it will be noted that the template element 64 has a circular disc-shaped portion 65 for overlying a major portion of the map W and is provided with a reference mark 65' at its center point. A positioning arm 66 extends radially and integrally from the template portion 65 for use in manually adjusting the mounted template 64, and a straight radial slot 67 for receiving the spindle portion 22" at different points therealong extends into the template portion 65 from its periphery 65''', but not to the mark 65', from a peripheral point opposite an indicated radial line 68 of the template arm 66. The slot 67 is arranged to slidably receive the larger spindle portion 22' while the template portion 65 is frictionally engaged between the map disc 25 and the spring member 27 for its frictionally resisted and retained adjustment about and/or radially of the received spindle with respect to the map disc.

As particularly indicated in FIGURES 13 and 14, the template element 64 has delineated on its disc portion 65 circular latitude lines 69 coaxial with the point 65' and radially spaced to represent scaled distances of 600 miles apart, with the innermost of these circular lines representing a radial distance of 600 Earth miles from the template point 65' and, as indicated by a radiating scale 70 adjacent the slot 67, providing the numerals between six and forty-eight by increments of six for indicating one-hundredth of the mileage significance of the line 69 and also provides a radiating azimuth scale 71 for its cooperative use with an appropriate star disc. Lines 72 delineated on the circular portion 65 of the template 64 and radiating from the point 65' represent meridian directions from said point, with these lines appropriately bowed with respect to radial chords thereof except in the combined straight diametric line of the slots 67 and the line 68, which indicates the position of the template with respect to the meridian lines of the time zone and the hour circle.

For using the template element 64 to ascertain the distance between reference and referenced points of the Earth, the central template mark 65' is registered with the reference map point, such as a particular city or other chosen reference point, while the spindle portion 22" is engaged in the template slot 67, whereby to directly ascertain the global distance between the reference and referenced points by reading directly on the line 70 when it passes through the referenced point. Also, it will be noted that the portion 65 of the template 64 is provided with a peripheral compass direction scale 76 having compass point designations 77 which are ten degrees apart starting from the line of the slot 67 and are numbered in order in a clockwise direction from the said slot whereby, with the template 64 set for determining distance between the reference and referenced points, the compass bearing between the points may be directly determined by reading the same directly on the scale 76. In this manner, a single setting of the template 64 is arranged to provide both distance and directional information for use in directing an aircraft or a missile between the reference and referenced Earth points.

For use of the present chart for celestial determinations, a transparent and circular disc 81, which is more or less indicated in FIGURES 2 to 4 and 9 and 13 and 14, provides a star map S and has an axial hole 81' for its centered mounting on the upper stem portion 22" while supported on the shoulder provided at the top of the lower stem portion 22'. The disc 81 is provided, in appropriate relative locations with reference to the axis of rotation of the Earth, with the location of Polaris indicated on the star map S at 82 and other indicated star locations and suitably identified in reference to different more prominent stars by their adjacent printed names 83. Preferably, and as shown in FIGURES 3 and 4 and 12, the spindle-centered star disc 81 is disposed for its protected and rotative adjustment within the upstanding annular flange 31''' of the plate 31 by retaining members 84 having arms thereof frictionally overlying the peripheral edge of the disc 81, said members 84 being suitably fixed to the oppositely extending parts 32 and 33 of the member 31 as by screws 85 extending therefrom radially outwardly of the flange 31'''.

It will now be noted that a continuous annular year date scale 86 is provided along the peripheral edge of the star disc 81, with said scale divided into twelve month-designating portions by radial lines 87 which are spaced to proportionally indicate between them the number of days in the different successive months of the year in counter-clockwise order by the names 88 thereof provided in the spaces; it will be noted, for instance, that the February space represents only twenty-eight day spaces. In reference to the date scale 86, the star disc 81 has an ecliptic zone 89 delineated thereon and having its center eccentrically related to the center of the disc at the hole 81' thereof, with this ecliptic zone indicating the path followed by the Sun and the Moon and the Planets and having its center at the Polaris point 82 in a radial line which extends from the common center of rotation of the map disc 25 and the star disc 81 to the Winter Solstice which occurs on or about Dec. 23 of each calendar year as indicated on the latter disc. Also delineated on the disc 81 is a more-or-less circular line 90 representing the celestial equator, it being noted that the lines 89 and 90 intersect at a common diameter which passes through the North Pole at the Spring and Fall Solstice periods.

A template member 91 is provided for mounting on the upper spindle portion 22″ for reference use with the mounted star disc 81 as positioned in terms of an Earth time setting thereof, and comprises, as disclosed in FIGURES 9 and 14, a circular portion 92 having a spindle-receiving opening 92′ at its center and a relatively narrow radial stem extension 93 having delineated thereon a radial line 93′ extending from said center opening 92′ and evenly divided along its length by cross-lines 93″ comprising calibration lines of scales 94 and 95 at opposite sides of the line 93′. As is brought out in FIGURE 14, the calibrations of the scale 94 are marked for declination and latitude readings, which the zero point of its scale at the cross-line 93″ through which the circle of the peripheral edge of the template portion 92 extends, while the remaining cross-lines of this scale are numbered in opposite directions from said zero point by tens to the terminal outer scale number "90" and to the inner scale number "80" which is one calibration space from the center 92′ of the template portion 92. The calibrations of the scale 95 are marked for polar distance readings starting from the zero thereof at the center of the template portion 92, while the lines 93″ of this scale extend to the terminal outer scale degree number "180."

Starting from the line 93′, the area of the circular portion 92 of the template element 91 is divided by radial lines 96 which are thirty degrees apart and provide calibration points of mutually concentric circular scales 97 and 98, with the scale 97 extending around the rim of the portion 92 and calibrated continuously in a counter-clockwise direction to indicate three hundred sixty degrees of arc in the celestial equator. The scale 98 is provided inwardly of the scale 97 along a meridian reference circle 98′ which is calibrated by the lines 96 extending oppositely from the line to a total of one hundred eighty degrees through the "30–60" point of the line 93′ and has, as indicated, East and West portions thereof extending oppositely for angular distances of one hundred eighty degrees from the line 93′. Since the use of all, or less than all, of the independently adjustable template member 64 and star disc 81 and template member 91 requires a clear view of all of the features of the underlying Earth map W, it will be understood that the transparency of said members and of the central portion 31′ of the base member is necessary.

When the star disc 81 is in use, the mounted disc is turned to dispose the month and day point of its scale 86 over the twelve o'clock noon point 42 of the map disc 25 of the Earth time zone of interest, whereby to ascertain the relative position of the heavens in relation to the Earth on that day. Since, however, only that portion of the heavens which is beyond a plane which is tangential to the Earth point of reference would then be visible as the disc 81 is turned about its axis at the spindle 22, the spindle 22, the spindle-mounted and positioned template 64 is further adapted for its use, if desired or required, before the template 91 is installed to ascertain the visible portion of the heavens with respect to a particular Earth point of reference by considering that its peripheral edge 65″ comprises the Earth horizon when the template center is over the map point of reference, with the evenly spaced nine circular distance lines 69 of this template then utilized by reference to the radial scale 71 adjacent the scale 70, for indicating the angular elevation from horizontal of a particular star which is visible in the heavens above the observation point. Simultaneously, the direction lines radiating from the point 65′ of the template 64 comprise azimuth lines indicating compass readings as measured from the true North by reference to the compass scale 65 of the mounted template 64. It will be understood that when the template 64 is in use for particular world point, it may be taped, or otherwise temporarily fixed, to the map disc 25 for rotation therewith for a determination of the visible star field at different Earth times.

With or without the template member 64 installed for use in ascertaining the star field area which is viewable from a given Earth reference point, and the template member 91 mounted on the outer spindle portion 22‴, the circles 89 and 90 of the star disc 81 respectively provide elevation and altitude indications with reference to a selector star 82 in the ascertained field of vision, it being noted that the direction lines 93 and 96 radiating from the center of the temple 91 may be considered as azimuth lines with respect to the compass scale 76 of the template 64, with the degrees of compass reading measured from the appointed true North position of Polaris. Accordingly, the scale 97 at the opposite side of the azimuth line 92 from the scale 98 then indicates the degree of elevation of a reference star above the plane of the horizon.

In view of the foregoing, it will be understood that the present chart apparatus variously utilizes the unitary base assembly 21 providing the hour circle 48 and mounting the Earth map disc element 25 for rotative adjustment about the base-carried spindle 22 with respect to the relatively fixed hour circle in cooperative association with the day indicators 51 and 56, as included in FIGURE 1 taken with the combined showing of FIGURES 5 and 7. Also, the accessory template 64 is usable with reference to the Earth map W of the disc 25 as a distance and direction template or is alternatively usable with reference to the star map of the spindle-mounted disc 81 for ascertaining the visible portion of the heavens from a given Earth point, and the declination of the indicated stars thereon with respect to a said point at a particular Earth time whereby this template is appropriately relatable to a particular star under observation respecting its declination and latitude and polar distance with relation to the Earth reference point, it being understood that the stars identified on the Star disc element 81 preferably include those most frequently used or usable in Earth or aerial or space navigation, and including the North star Polaris which is effectively located in the spindle axis.

It will thus be understood that the described possible relatively adjustable and associated uses with the fixed hour circle of the base element 21 of the present Earth map element 25 and the transparent template element 64 and star map element 81 and template element 91 are particularly valuable in planning or effecting surface (ground or water) travel or respecting air or space flight, and that the determinations so made with a given assembly may have practical utility or instructional or educational value in accordance with the principles involved in the determinations made. Furthermore, it will be understood that the spindle 22 might be power driven in synchronism with the relatively slow rotative rate of the hour hand of a twenty-four hour clock or the like for facilitating desired determinations by the use of a particular chart assembly. It will thus be apparent that the present different manners of designating the global time zones have been designed to appropriately facilitate settings of the template 64 and/or the Star disc 81 and/or the template 91 in an assembly including them.

From the foregoing description taken with the accompanying drawings, the advantages of the present time and space chart will be readily understood by those skilled in the art to which the invention appertains. While I have shown and described structures and arrangements of elements which I now consider to present preferred embodiments of my invention, it will be understood that the showing is primarily illustrative, and that such changes and developments may be made, when desired, as fall within the scope of the following claims:

1. In a navigation chart, a unitary base structure comprising a planar outer annular opaque portion providing the delineation at its outer face of a siderial twenty-four hour circle bounding a full circular axial viewing zone through the hour circle of the outer base portion, an inner base portion opposite said outer base portion in fixed opposed spaced relation thereto, an element-positioning spindle member extending rigidly from said inner base portion and directed axially through and beyond said hour circle, an Earth disc element providing for reference at its outer face a polar asimuthal map projection of the Earth including means indicating the Earth hour time zones, means supportedly and rotatively mounting the Earth disc on the spindle between the said base portions for its rotative adjustment for a selective referencing to said hour circle of points in the different Earth map time zones for ascertaining the clock time in a referenced time zone of the Earth disc with respect to a referencing Earth time of the hour circle, the international date line of the Earth disc is arranged for its registration with the intermediate midnight hour of the hour circle, separate indicator discs are respectively carried on said Earth disc and the upper base portion for changeably and simultaneously displaying the same two successive days of the week with reference to the international date line at overlying sight openings provided in the respective base and disc portions, and means are provided whereby simultaneous rotative adjustments of said indicator discs in either possible direction of movement of said international date line meridian to opposite sides of said midnight point of the hour circle is operative to correspondingly change the displayed pair of indications of both indicator discs.

2. The combination of claim 1 in which the indicator discs are respectively supported on the beneath the Earth disc element inwardly of the hour circle and on and beneath the upper base element outwardly of the hour circle for rotative adjustments thereof about mutually parallel axes parallel to the spindle axis, the different said indicator members having on the upper faces thereof seven sector-shaped areas having different successive days of the week designated thereon in circular array and in mutually reverse order in their lines for the simultaneous presentation of solely two of said adjacent said indications at opposed sight openings provided in the Earth disc and the upper base portion, means simultaneously cooperative between the bottom base member and the indicator member carried by the Earth disc and between the Earth disc and the indicator member carried by the upper base portion as the international date line passes the midnight point of the hour circle to change both displayed indications of the indicator discs by the same week day.

3. In a navigation chart, a unitary base structure comprising a planar outer annular opaque portion providing the delineation at its outer face of a siderial twenty-four hour circle bounding a full circular axial viewing zone through the hour circle of the outer base portion, an inner base portion opposite said outer base portion in fixed opposed spaced relation thereto, an element-positioning spindle member extending rigidly from said inner base portion and directed axially through and beyond said hour circle, an Earth disc element providing for reference at its outer face a polar azimuthal map projection of the Earth including means indicating the Earth hour time zones and the international date line, means supportedly and rotatively mounting the Earth disc on the spindle between the said base portions for its rotative adjustment for a selective reference to said hour circle of points in the different Earth map time zones for ascertaining the clock time in a referenced time zone of the Earth disc with respect to a referencing Earth time of the hour circle, a transparent template element comprising a circular portion having its center point indicated and provided with a radial slot extending from its edge toward, but not to, said center point and slidably receiving the spindle, means for frictionally securing the template in adjusted set engagement with the upper face of the Earth disc while disposed in the slot transversely of the template element, said circular template portion being provided with identified radial meridian lines extending from its center point and an associated peripheral compass scale for use in ascertaining global directions and distances between reference and referenced points of the Earth disc when the center of said circular template portion is registered with a reference point of the Earth disc.

4. In a navigation chart, a unitary base structure comprising a planar outer annular opaque portion providing the delineation at its outer face of a siderial twenty-four hour circle bounding a full circular axial viewing zone through the hour circle of the outer base portion, an inner base portion opposite said outer base portion is fixed opposed spaced relation thereto, an element-positioning spindle member extending rigidly from said inner base portion and directed axially through and beyond said hour circle, an Earth disc element providing for reference at its outer face a polar azimuthal map projection of the Earth including means indicating the Earth hour time zones and the international date line, means supportedly and rotatively mounting the Earth disc on the spindle between the said base portions for its rotative adjustment for a selective referencing to said hour circle of points in the different Earth map time zones for ascertaining the clock time in a referenced time zone of the Earth disc with respect to a referencing Earth time of the hour circle, a transparent Star disc element coaxially mounted on the spindle above the hour circle of the base for rotative adjustments about its axis relative to said Earth map disc and provided with a map of reference stars in polar azimuthal equidistant projection corresponding to that of the Earth disc and peripherally providing a continuous month-and-day calendar scale adapted for the registration of a selected calendar day indication with a selected zone of the hour circle for use in ascertaining the azimuthal direction of an indicated star with respect to a current referencing earth hour zone, a transparent template element mounted on the spindle adjacent the Star disc for its rotatively adjusted use with the Star disc as positioned in terms of an Earth month-and-day setting thereof with reference to the Earth time as a particular time zone, a circular portion of the template having a spindle-receiving opening at its center and provided with a calibrated coaxial celestial equator circle and a calibrated East-and-West Earth compass circle, with said discs portion further provided with a positioning stem extension having delineated thereon a straight radial line extending from said center opening and evenly divided along its length by cross-lines comprising calibrations passing through the zero point of the celestial equator circle and providing a scale of star declination and latitude readings from a zero point at the crossline through which the celestial equator circle of the circular template portion extends for cooperative reference to the Earth and Star discs at opposite sides of said Earth equator circle.

5. In a navigation chart, a unitary base structure comprising a planar outer annular opaque portion providing the delineation at its outer face of a siderial twenty-four hour circle bounding a full circular axial viewing zone through the hour circle of the outer base portion, an inner base portion opposite said outer base portion in fixed opposed spaced relation thereto, an element-positioning spindle member extending rigidly from said inner base portion and directed axially through and beyond said hour circle, an Earth disc element providing for reference at its outer face a polar azimuthal map projection of the Earth including means indicating the Earth hour time zones and the international date line, means supportedly and rotatively mounting the Earth disc on the spindle between the said base portions for its rotative adjustment for a selective referencing to said hour circle of points in the different Earth map time zones for ascertaining the clock time in a referenced time zone of the Earth disc with respect to a referencing Earth time of the hour circle, a transparent Star disc element coaxially mounted on the spindle above the hour circle of the base for rotative adjustments about its axis relative to said Earth map disc and provided with a map of reference stars in polar azimuthal equidistant projection corresponding to that of the Earth disc and peripherally providing a continuous month-and-day calendar scale adapted for the registration of a selected calendar day indication with a selected zone of the hour circle for use in ascertaining the azimuthal direction of an indicated star with respect to a current referencing earth hour zone, a flat transparent template element comprising a circular portion having its periphery that of the horizon circle of the Earth as used from a reference Earth disc point which is registered with the center point of the member and is provided with a radial slot extending from its periphery toward its marked center for guidingly receiving the spindle while a referenced star designation of the Star disc is visible through the slot, with the pivoted said template element provided with a plurality of latitude lines concentric with the template center and evenly spaced between the template center and its periphery and a radial angle scale for said lines for use in ascertaining the angular elevation of the designated star in the peripheral horizon circle of the template element.

References Cited

UNITED STATES PATENTS

| | | |
|---|---|---|
| 635,268 | 10/1899 | Osse. |
| 869,241 | 10/1907 | Hillyer _____ 235—78 |
| 1,122,429 | 12/1914 | Schwager _____ 235—88 |
| 1,145,020 | 7/1915 | Hill _____ 235—88 |
| 2,337,545 | 12/1943 | Collins _____ 35—44 |
| 2,397,002 | 3/1946 | Hagner _____ 35—44 |
| 2,532,324 | 12/1950 | Milligan _____ 235—83 |
| 2,543,815 | 3/1951 | Waller et al. _____ 35—44 |
| 2,545,555 | 3/1951 | Perillo _____ 235—78 |
| 2,694,522 | 11/1954 | Sturgell et al. _____ 235—88 |
| 3,003,258 | 10/1961 | Stefans _____ 235—78 |

RICHARD B. WILKINSON, *Primary Examiner.*

J. G. MURRAY, L. R. FRANKLIN,
*Assistant Examiners.*